United States Patent [19]
Onoe et al.

[11] Patent Number: 5,210,751
[45] Date of Patent: May 11, 1993

[54] SIGNAL TRANSMISSION SYSTEM CAPABLE OF PERFORMING RE-TRANSMISSION CONTROL IN UNITS OF SLOTS

[75] Inventors: Seizo Onoe, Yokohama; Kimitoshi Funakawa, Hoya; Narumi Umeda; Tamami Suzuki, both of Yokohama, all of Japan

[73] Assignee: Nippon Telegraph and Telephone Corporation, Tokyo, Japan

[21] Appl. No.: 839,031

[22] Filed: Feb. 18, 1992

Related U.S. Application Data

[63] Continuation-in-part of Ser. No. 584,354, Sep. 18, 1990, abandoned.

[30] Foreign Application Priority Data

Sep. 19, 1989 [JP] Japan ................................. 1-240500

[51] Int. Cl.$^5$ .......................... G08C 25/02; H04J 3/24
[52] U.S. Cl. ..................................... 370/94.1; 370/77; 371/32
[58] Field of Search ...................... 370/94.1, 94.2, 94.3, 370/60, 60.1, 13, 95.1; 371/30, 32, 33, 35

[56] References Cited

U.S. PATENT DOCUMENTS

| | | | |
|---|---|---|---|
| 4,071,706 | 1/1978 | Warren | 370/94.1 |
| 4,439,859 | 3/1984 | Donnan | 371/30 |
| 4,517,669 | 5/1985 | Freeburg et al. | 370/94.2 |
| 4,519,068 | 5/1985 | Krelos et al. | 370/94.2 |
| 4,525,837 | 6/1985 | Tan et al. | 370/94.2 |
| 4,712,214 | 12/1987 | Meltzer et al. | 371/32 |
| 4,829,526 | 5/1989 | Clark et al. | 371/35 |

Primary Examiner—Douglas W. Olms
Assistant Examiner—H. Kizou
Attorney, Agent, or Firm—Frishauf, Holtz, Goodman & Woodward

[57] ABSTRACT

In a message-transmitting station, a signal to be transferred is divided into a plurality of time slots, an error correcting/detecting code is added to each time slot, and a re-transmission sequence order number in unit of messages, a re-transmission number and an address designating ID of a terminal device are added to a specified time slot. Then, data of the time slots are transmitted from the message-transmitting station to a message-receiving station. In the message-receiving station, it is determined whether or not any order number is missing, by demodulating and decoding the data unit containing the re-transmission sequence order number and the address, and a re-transmission request signal is transferred in accordance with the result of the comparison between the sequence number included in the demodulated, decoded data unit and the sequence number received last as an indication of the condition in which the data in each data unit has reached the message-receiving station. Further, at least one of any specified and all of the time slots are re-transmitted from the message-transmitting station in accordance with the re-transmission request signal supplied from the message-receiving station.

5 Claims, 12 Drawing Sheets

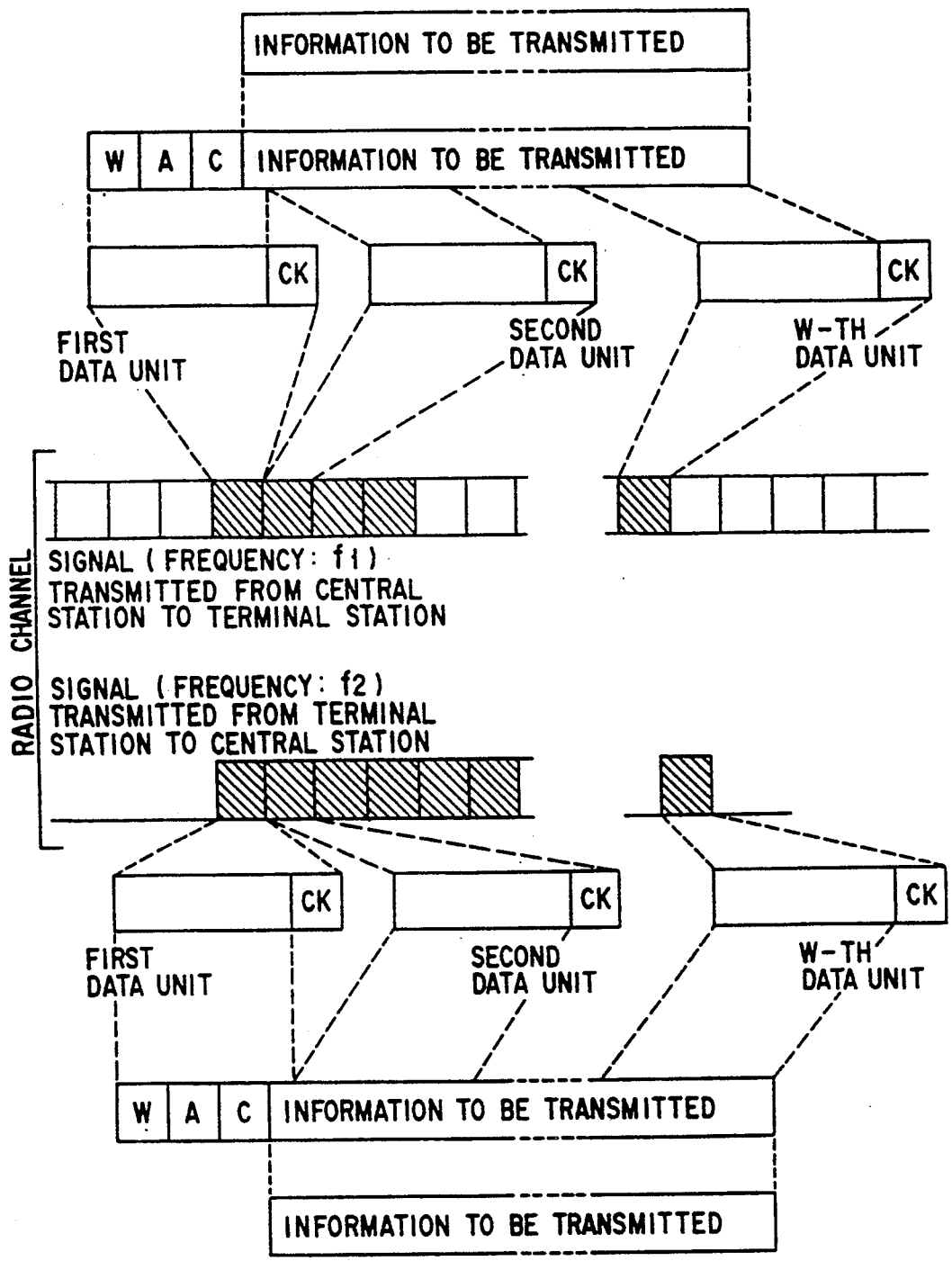
F I G. 10

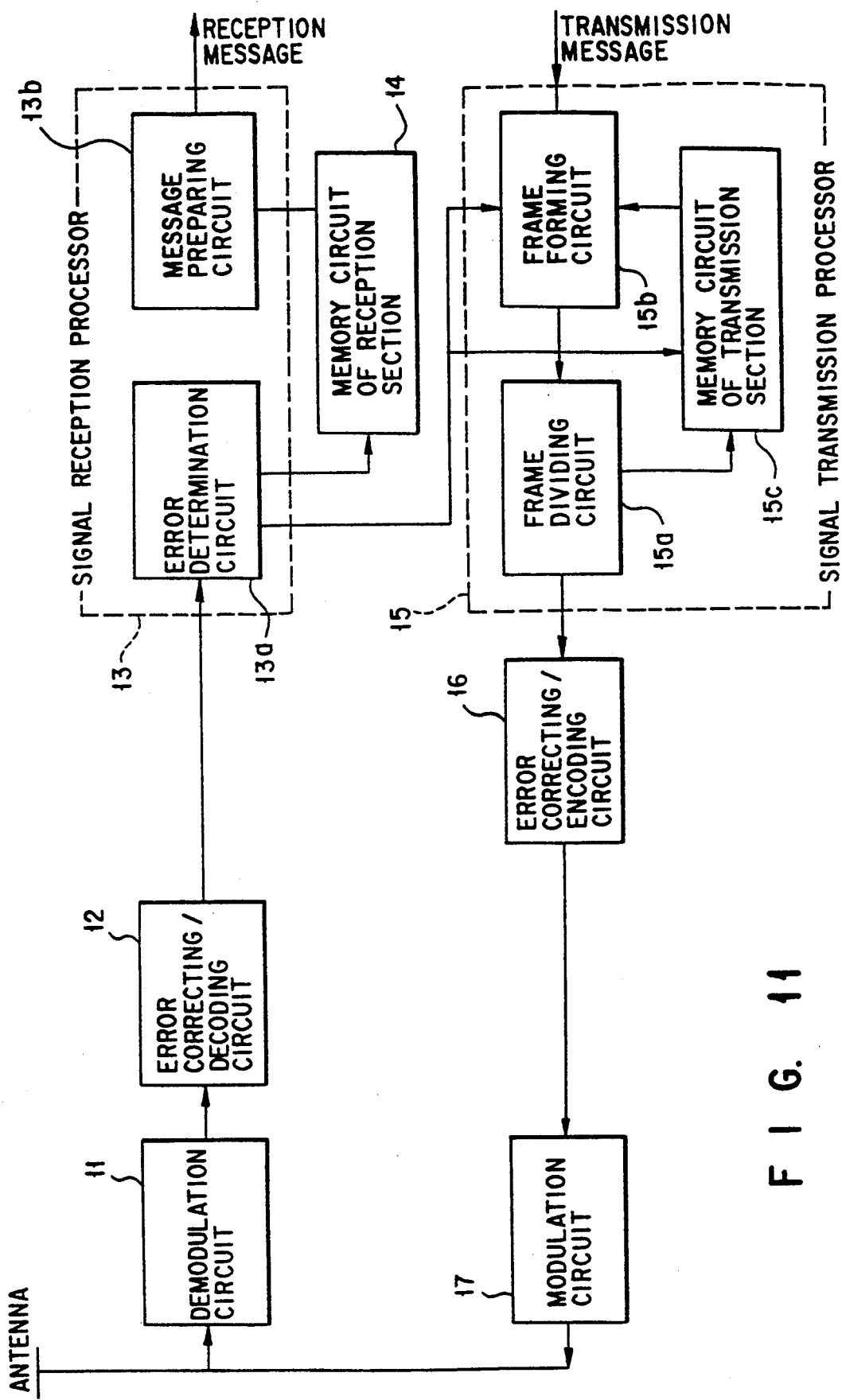
F I G. 11

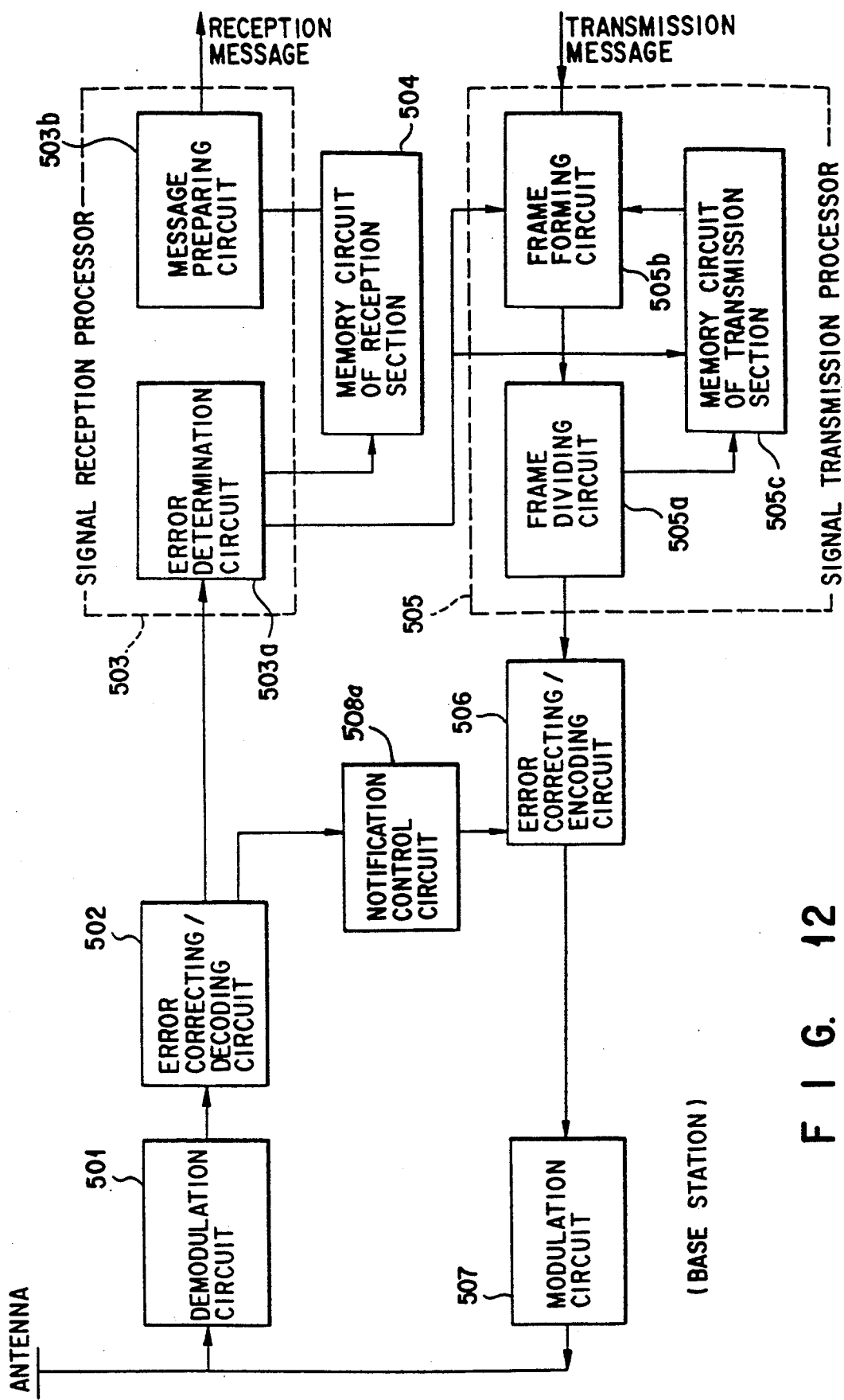
F I G. 12
(BASE STATION)

SIGNAL TRANSMISSION SYSTEM CAPABLE OF PERFORMING RE-TRANSMISSION CONTROL IN UNITS OF SLOTS

This application is a continuation-in-part of application Ser. No. 07/584,354 filed Sep. 18, 1990, now abandoned.

BACKGROUND OF THE INVENTION

1. Field of the Invention

The present invention essentially relates to a signal transmission system and, more particularly, to a signal transmission system for transferring long messages, such as user packets, in a mobile communication system whose transmission paths have relatively low reliability.

2. Description of the Related Art

Hitherto, various re-transmission control systems, such as a Go-Back-N (GBN) system and a Selective-Repeat (SR) system, have been proposed and actually employed for the data-link layer protocol such as HDLC (High-Level Data Link Control) or the like.

In the GBN system, a plurality of frames are transmitted simultaneously, and all frames are transmitted again even if any of the frames has failed to reach a receiving station. In the SR system, a plurality of frames are transmitted simultaneously, and only one or more of the frames, which have failed to reach a receiving station, are transmitted again to the station.

In a mobile transmission system having transmission paths in which fading may occur and which are therefore unreliable, the failure rate of transferred words (or control signals), which amounts to only about 10 bytes, may be reduced to about $10^{-2}$ by using, for example, error correcting codes. When data of about 2 kilobytes is transferred, however, the failure rate of data will be 0.86, if not affected by the failure rate determined for each subsection of the mobile communication system. Obviously, the mobile communication system has but extremely low reliability.

In other words, the mobile communication system is sufficiently reliable as long as re-transmission control is performed on a relatively small amount of data, such as control signals. However, when the re-transmission control is performed on a large amount of data, such as a user packet, the data signals must be transferred many times, and many re-transmission request signals must be transmitted from the receiving station. Consequently, the transmission paths of the system become so "overcrowded" that data can scarcely be transmitted through them.

In order to avoid the overcrowding of the paths, a great amount of data may be divided into small blocks, and these data blocks may be transferred through the paths under the conventional re-transmission control. If this method is used, however, a transmission sequence order number must be added to each data block. Further, the ID number assigned to the mobile station to which the data block is to be transferred must also be added to the data block, particularly when the mobile system includes many mobile stations. When an order number and an ID number are added to each data block, the operating efficiency of the mobile system decreases inevitably.

Furthermore, if the conventional re-transmission control is applied in the mobile communication system, it will be necessary to divide a message into blocks and reconstruct it in accordance with the instruction of upper layers. Obviously, complex data-processing must be performed in order to divide and reconstruct a message.

SUMMARY OF THE INVENTION

It is, therefore, an object of the present invention to provide a new and improved signal transmission system which can reliably transmit long messages, such as user packets, even if the transmission paths used have relatively low reliability.

The present invention is characterized in two respects. First, the signals to be transferred are divided into a plurality of time slots, and an error correcting-/detecting code is added to each time slot. Second, use is made of a signal including a re-transmission sequence order number in unit of messages and a re-transmitted slot number signal as a re-transmission request signal and a message-transfer signal.

According to one aspect of the present invention, there is provided a digital communication method of transferring messages between a terminal device and a central device, the method comprising the steps of:

dividing a signal to be transferred into a plurality of time slots in a transmitting station;

processing an error correcting/detecting coding to each time slot in the transmitting station;

transferring data including a re-transmission sequence order number in unit of messages, re-transmission slot number and an address designating ID of the terminal device to a specified time slot as a re-transmission request signal and a massage-transfer signal added to a signal processed by the processing step, in the transmission station;

determining whether or not any order number is missing in a receiving station, by demodulating the time slot containing the re-transmission sequence order number and the address;

transferring a re-transmission request signal from the receiving station, in accordance with the determining resultant and the condition in which each time slot has reached the receiving station; and re-transmitting at least one of any specified and all of the time slots from the transmitting station in accordance with the re-transmission request signal transferred from the receiving station.

According to another aspect of the invention, there is provided a digital communication system for transferring messages between a terminal device and a central device, the system comprising:

a message-transmitting station comprising:

a) means for dividing a signal to be transferred into a plurality of time slots;

b) means for processing an error correcting/detecting coding to each time slot divided by the dividing means; and c) means for transferring data including a re-transmission sequence order number in unit of messages, a re-transmission slot number and an address designating ID of the terminal device to a specified time slot as a re-transmission request signal and a massage-transfer signal added to a signal processed by the processing means; and a message-receiving station comprising:

a) means for demodulating the data transferred from the message-transmitting station; and b) means for determining whether or not any order number is missing in the message-receiving station, in accordance with the time slot containing the re-transmission sequence order number and the address and demodulated by the demodulating means time slots, and for transferring a re-transmission request signal, in accordance with the determining resultant and the condition in which each time slot has reached the message-receiving station, wherein the message-transmitting station further comprises:

d) means for re-transmitting at least one of any specified and all of the time slots from the transmitting device in accordance with the re-transmission request signal supplied from the receiving station Additional objects and advantages of the invention will be set forth in the description which follows, and in part will be obvious from the description, or may be learned by practice of the invention.

BRIEF DESCRIPTION OF THE DRAWINGS

The accompanying drawings, which are incorporated in and constitute a part of the specification, illustrated presently preferred embodiments of the invention and, together with the general description given above and the detailed description of the preferred embodiments given below, serve to explain the principles of the invention.

FIG. 10 is a diagram similar to FIG. 9, but for a FDMA system.

FIG. 11 is a block diagram illustrating a more specific arrangement of the present invention.

FIG. 12 is a block diagram illustrating the structure of a base station.

DETAILED DESCRIPTION OF THE PREFERRED EMBODIMENTS

Figure 1:
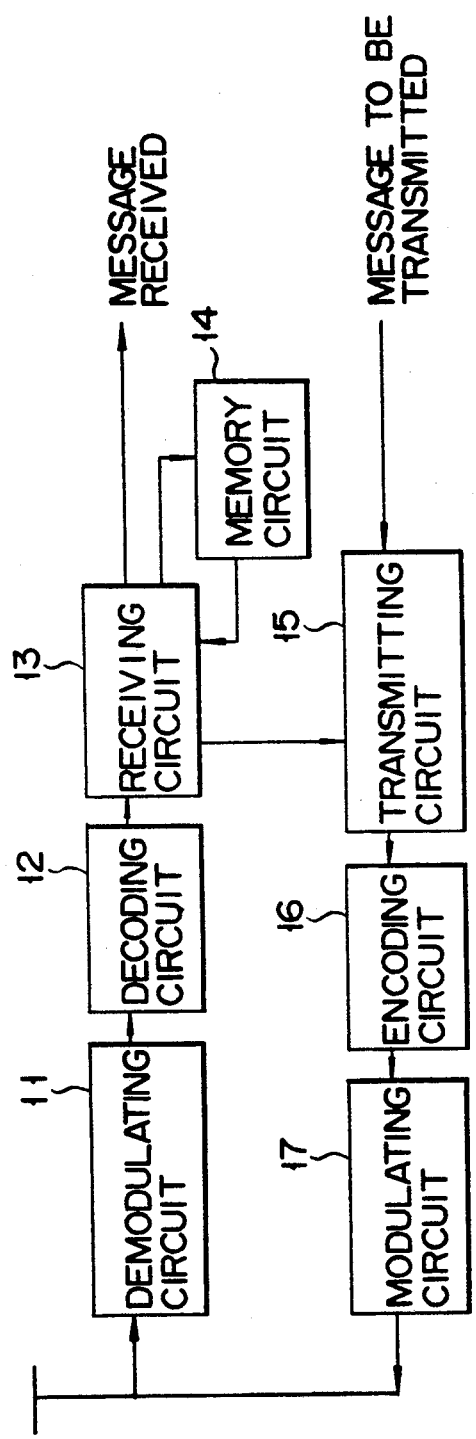
FIG. 1 is a block diagram showing a station used as either as a terminal station or a central station in a mobile communication system according to a first embodiment of the present invention.

Reference will now be made in detail to the presently preferred embodiments of the invention as shown in the accompanying drawings, in which like reference characters designate like or corresponding parts throughout the several drawings.

FIG. 1 is a block diagram showing a station used as either as a terminal station or a central station incorporated in a mobile communication system according to a first embodiment of the present invention. As is shown in FIG. 1, this station comprises a demodulating circuit 11, a decoding circuit 12, a receiving circuit 13, memory circuit 14, a transmitting circuit 15, a coding circuit 16, and a modulating circuit 17.

Figure 2:
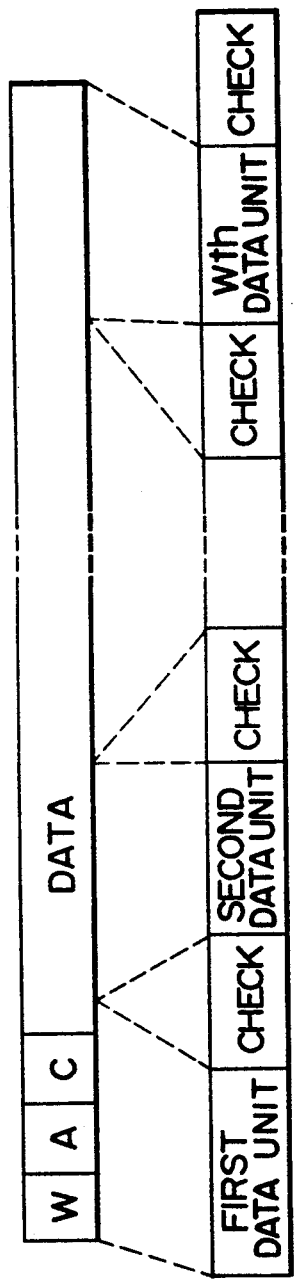
FIG. 2 is a diagram explaining the outline of a signal structure used in the mobile communication system.

FIG. 2 shows the outline of a signal structure used in the mobile communication system. The upper half of this figure shows the message, which is comprised of data W representing the format of the message, an address field A, a control field C, a data field, and the like. The lower half of FIG. 2 explains how the message is divided into a plurality of data units having a predetermined length, and how an error correcting/detecting code (i.e. "check") is added to each of these slots. As is evident from FIG. 2, the first data unit consists of the data W, the address field A and the control field C. Nevertheless, the data W and the fields A and C can be divided into two or more data units. Further, the message can be bit-interleaved. Still further, the data units can be set apart on the time axis, so that they may be transmitted in the form of bursts.

Figure 3:
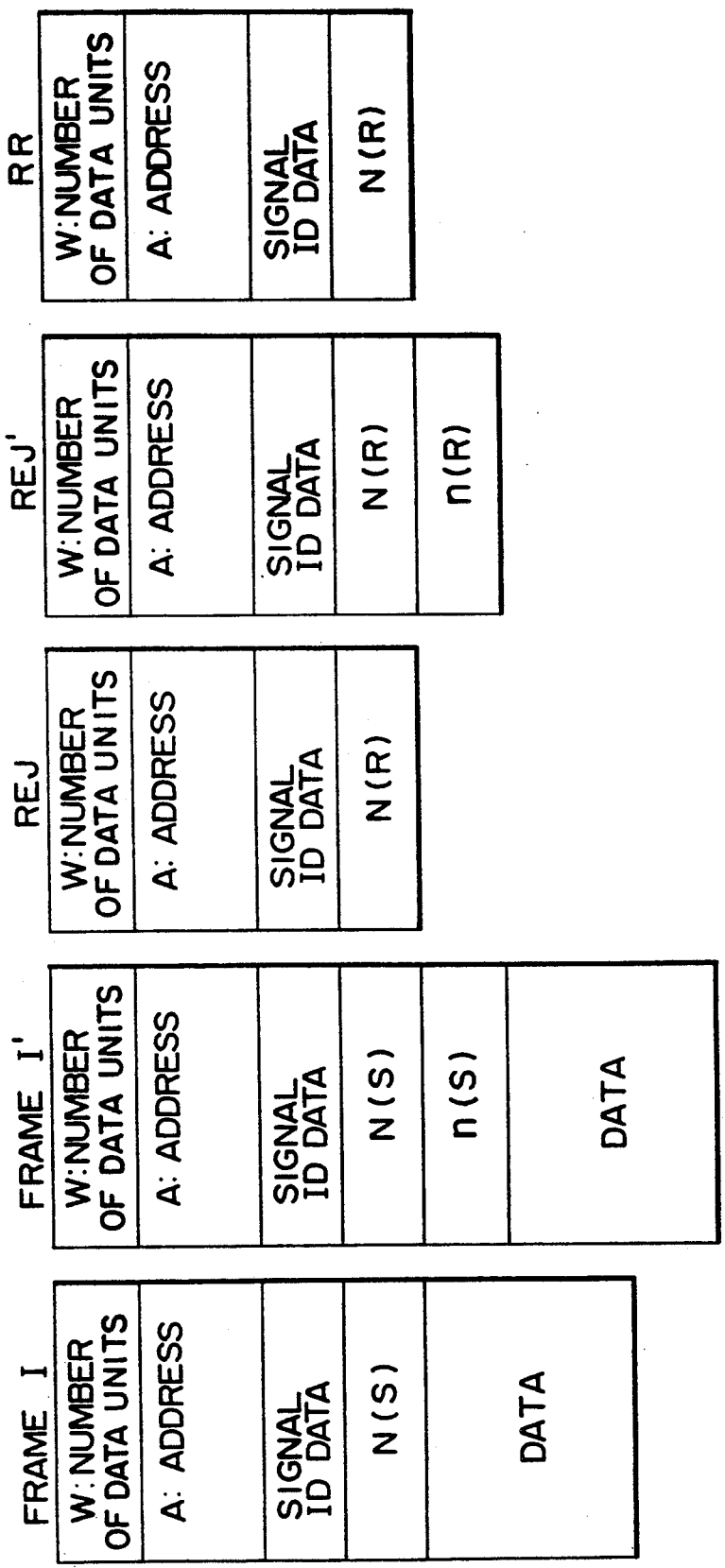
FIG. 3 is a diagram representing the format of a message transfer signal and that of a re-transmission request signal, both signals being used in the mobile communication system.

FIG. 3 is a diagram representing the format of a message transfer signal and that of a re-transmission request signal, both signals being used in the mobile communication system. In other words, FIG. 3 is a detailed representation of the upper half of FIG. 2. Shown in FIG. 3 are: a frame I which is the format used to transmit the entire message to be transmitted; a frame I' which is the format used to transmit a data unit, i.e., a part of the message; REJ (an abbreviation of REJect) which is the format used to re-transmit the entire message; REJ' is the format used to re-transmit a data unit, i.e., a part of the message; and RR (Receive Ready) is the format used to acknowledge the receipt of any data.

In each of the formats shown in FIG. 3, data W represents the configuration of the message, that is, the number of data units forming the message, the number of valid bits constituting the last data unit (i.e., the Wth data unit), and the like. As can be understood from FIG. 3, an error correcting/detecting code is added to the first data unit which contains data W, an address field A, etc. Instead, in order to achieve random access control, an error correcting/error detecting code can be added to the data W only. This technique of adding the code to the data W only is advisable when the data W must be decoded in the central station as fast as is possible in order to prohibit the transmission of any other signals or data during the transmission of the data W which represents the number of data units constituting the message.

In the embodiment shown in FIGS. 2 and 3, the same error correcting/detecting code is added to any data unit. Nevertheless, an error correcting/detecting code of a greater magnitude can be added to the first data unit since this data unit, which contains an address field and a control field, is more important than any other data unit.

The address field A contains terminal-station ID data for identifying a plurality of terminal stations. Also, it contains ID data for setting a plurality of logic links within each terminal station in order to achieve various tasks such as signaling.

The control field C consists of signal ID data, a transmission sequence order number N(S) of the message, a reception sequence order number N(R) of the message, a transmission sequence order number n(S) of the data unit, and a reception sequence order number n(R) of the data unit. The signal ID data consists of codes which are used to identify the formats I, I', REJ, and REJ'.

In the communication system a part of which is shown in FIG. 1, GBN re-transmission control is carried out in high level data link control (HDLC) procedure, by using the number N(S) and the number N(R). More specifically, to re-transmit data in units of messages, both numbers N(S) and N(R) are reset in the transmitting station and also in the receiving station and then are set to "0." The transmitting station transmits the first message whose transmission sequence order number is "0." Thereafter, the number N(S) is continuously incremented, each time by one, whereby the transmitting station transmits the next messages, one by one. The receiving station receives these messages transmitted from the transmitting station. Every time the receiving station receives a message, it transfers the format RR, representing the number N(R)=N(S)+1, to the transmitting station, thereby acknowledging the receipt of the message. Upon receipt of the format RR, the transmitting station determines that the receiving station has received any message having the reception sequence order number less than the number N(R). Hence, the message whose reception sequence order number is less than the N(R) represented by the format RR can be erased from the transmission buffer incorporated the transmitting station.

Should any frame I fail to reach the receiving station due to the malfunction of the transmission path, the transmission sequence order number N(S) of this frame I is missing in the receiving station. In this case, the receiving station transfers the format REJ representing the number N(S)+1 to the transmitting station. Upon receipt of this format REJ, the station which is transmitting the frame I re-transmits the messages the first of which has the number N(S)+1. In this way, the system a part of which is shown in FIG. 1 performs re-transmission control in data units of messages.

Furthermore, in the receiving station it is determined whether or not the data units have been received, by detecting the error correcting codes (CHECK) which are respectively associated with data units as is shown in FIG. 2. If all data units forming the message have been received, it is determined that the message has reached the receiving station. Should the first data unit fail to reach the receiving station, then it is determined that the entire message has not reached the receiving station. On the other hand, if the first data unit has reached the receiving station, but one or more of the following data units have not, the receiving station sets the number N(S) contained in the first data unit to N(R), the number N(S) is set to the number N(R). Then, the receiving station transfers, to the transmitting station, the format REJ' which represents the number n(R), where n=k−1 (k is the serial number of the first of the data unit not having reached the receiving station).

Upon receipt of the format REJ', the station which is transmitting the frame I transmits the frame I' containing the data unit corresponding to the format REJ'. This frame I' is comprised of four parts: (1) the number N(S) set in the control field C of the first data unit; (2) the number N(R) of the format REJ', replacing the number N(S) of the first data unit; (3) the number n(R) of the format REJ', replacing the number n(S) of the first data unit; and (4) the re-transmitted data unit corresponding to the first of the data unit not having reached the receiving station. The data field of the first data unit can contain either dummy data or data identical to the data which has reached the receiving station. The dummy data or the data contained in the data field of the first data unit can be used to correct errors, if any, in the first data unit of the frame I'. In the receiving station, the relationship between the frame I' and the frame I, which has not reached the station in its entirety, is determined by the address and the number N(S), and the data unit re-transmitted in the frame I' is combined with the data unit transmitted in the first frame I, thereby reconstructing the whole message.

With reference to FIG. 1, it will now be explained how a message is transferred from a terminal station to the central station. Once the message is input to the transmitting circuit 15 of the terminal station, the circuit 15 generates a frame I containing a number N(S) by the method described above. The frame I is encoded by the encoding circuit 16, then modulated by the modulating circuit 17, and finally transmitted from the terminal station to the central station.

In the central station, which has the same structure as the terminal station, the demodulating circuit 11 demodulates the frame I, and the decoding circuit 12 decodes the demodulated frame I. The decoded frame I is input to the receiving circuit 13. The circuit 13 analyzes the address of the first data unit of the message, and checks the number N(S) assigned to the address. More precisely, the receiving circuit 13 determines whether or not the number N(S) of the frame I is greater by one than the number of N(S) of the frame I which has been previously input to the circuit 13 at the same address. If NO, the receiving circuit 13 supplies a re-transmission request to the transmission circuit 15. If YES, and if the central station has received all data units forming the message, the circuit 13 outputs the message received, and supplies the transmission circuit 15 with the data representing the number N(R) which will be represented by a format RR. If YES, and if the central station has not received any data unit other than the first, the data units received are stored into the memory circuit 14, and the receiving circuit 13 supplies a re-transmission request to the transmitting circuit 15, so that the data unit identified by a format REJ' may be transmitted again from the terminal station to the central station. When the frame I' is transmitted from the terminal station to the central station, the frame I is read from the memory circuit 14 in accordance with the address and number N(S) of the frame I'. Then, the data unit re-transmitted in the frame I' is combined with the data unit contained in the frame I read out of the memory circuit 14, in accordance with the transmission sequence order number n(S) of the data unit.

If there are data units which the central station has not received yet, the receiving circuit 13 supplies re-transmission requests, one after another, to the transmitting circuit 15, whereby the data units are transmitted again in the frame I' from the terminal station to the central station. When the central station receives all data units of the message, the receiving circuit 13 combines these data units, thus reconstructing the message. The message, thus reconstructed, is supplied from the receiving circuit.

Figure 4:
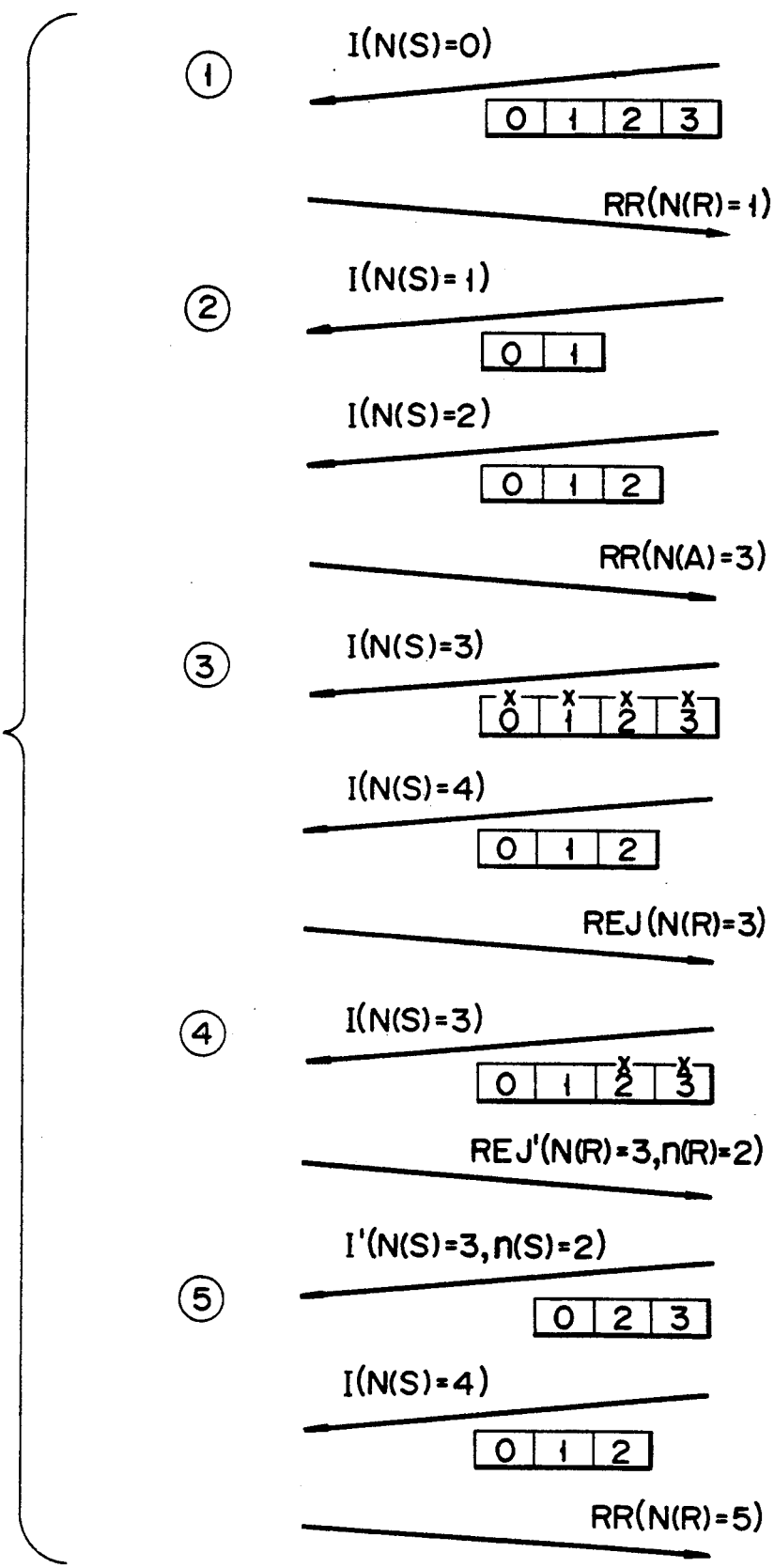
FIG. 4 is a flow chart explaining the operation of the mobile communication system.

FIG. 4 is a flow chart explaining how the communication system, a part of which is shown in FIG. 1, operates to transfer one frame of data from one station to another, i.e., for from the right to the left in FIG. 4. In step 1, the transmitting station transfers the frame I (N(S)=0) to the receiving station, and the receiving station transfers the number RR (N(S)=N(S)+1=1) to the transmitting station, upon receipt of the frame I. Then, in step 2, the transmitting station transfers the frame I (N(S)=1) and the frame I (N(S)=2), one after the other, to the receiving station. When the receiving station receives both frames, it transfers the format RR (N(R)=3) to the transmitting station, thereby acknowledging the receipt of both frames representing numbers N(S)=1 and N(S)=2. In the next step, i.e., step 3, the transmitting station transfers two frames I (N(S)=3) and I (N(S)=4). Assuming that the receiving station receives only the latter frame I (N(S)=4), the receiving station transfers the format REJ (N(S)=3) again to the transmitting station, thus the requesting re-transmission of the frame I (N(S)=3). The communication procedure performed thus far is identical to the ordinary HDLC.

In step 4, the transmitting station transfers the frame I (N(S)=3) again. If the second and third data units fail to reach the receiving station, the receiving station transfers the format REJ' representing the numbers N(R)=3 and n(R)=2, thus requesting the re-transmission of the second and third data units. Hence, in step 5, the transmitting station transmits again frames I'(N(R)=3) and I'(n(R)=2) to the receiving station, and then transmits also the frame I(N(S)=4) again. Upon receipt of the three frames I'(N(R)=3), I'(n(R)=2), and I(N(S)=4), the receiving station transfers the format RR representing the number N(R)=5 to the transmitting station. Hence, in the receiving station it is determined that the frames up to the frame I(N(S)=4).

Figure 5:
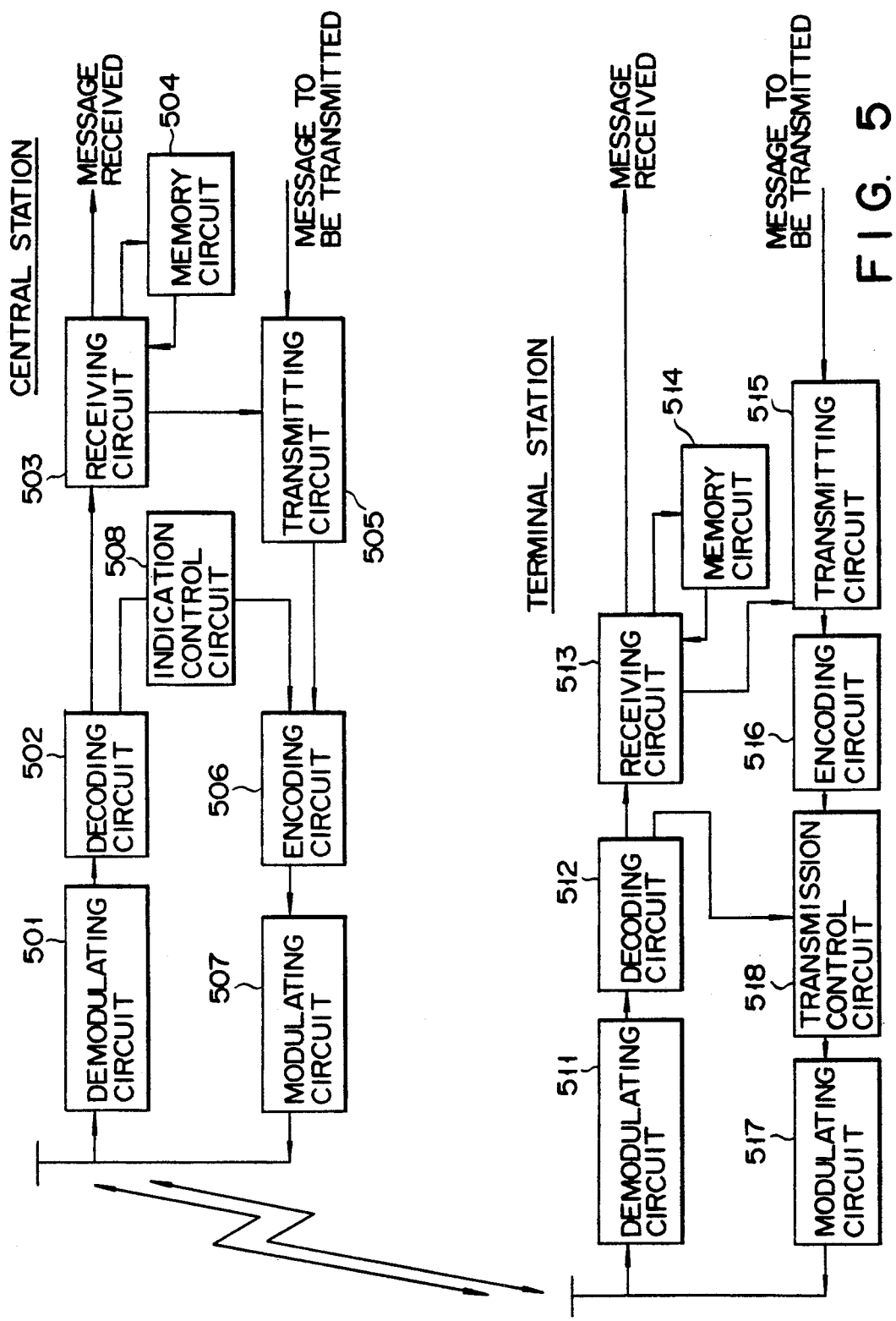
FIG. 5 is a block diagram illustrating the central station and a terminal station, both incorporated in a communication system according to a second embodiment of the invention, and explaining how data is random-accessed to the central station from the terminal station.

FIG. 5 is a block diagram illustrating the central stations and one of the terminal station, all incorporated in a communication system according to a second embodiment of the invention. As is shown in FIG. 5, the central station comprises a demodulating circuit 501, a decoding circuit 502, a receiving circuit 503, memory circuit 504, a transmitting circuit 505, an encoding circuit 506, a modulating circuit 507, and an indication control circuit 508. The terminal station comprises a demodulating circuit 511, a decoding circuit 512, a receiving circuit 513, a memory circuit 514, a transmitting circuit 515, an encoding circuit 516, a modulating circuit 517, and a transmission control circuit 518.

Figure 6:
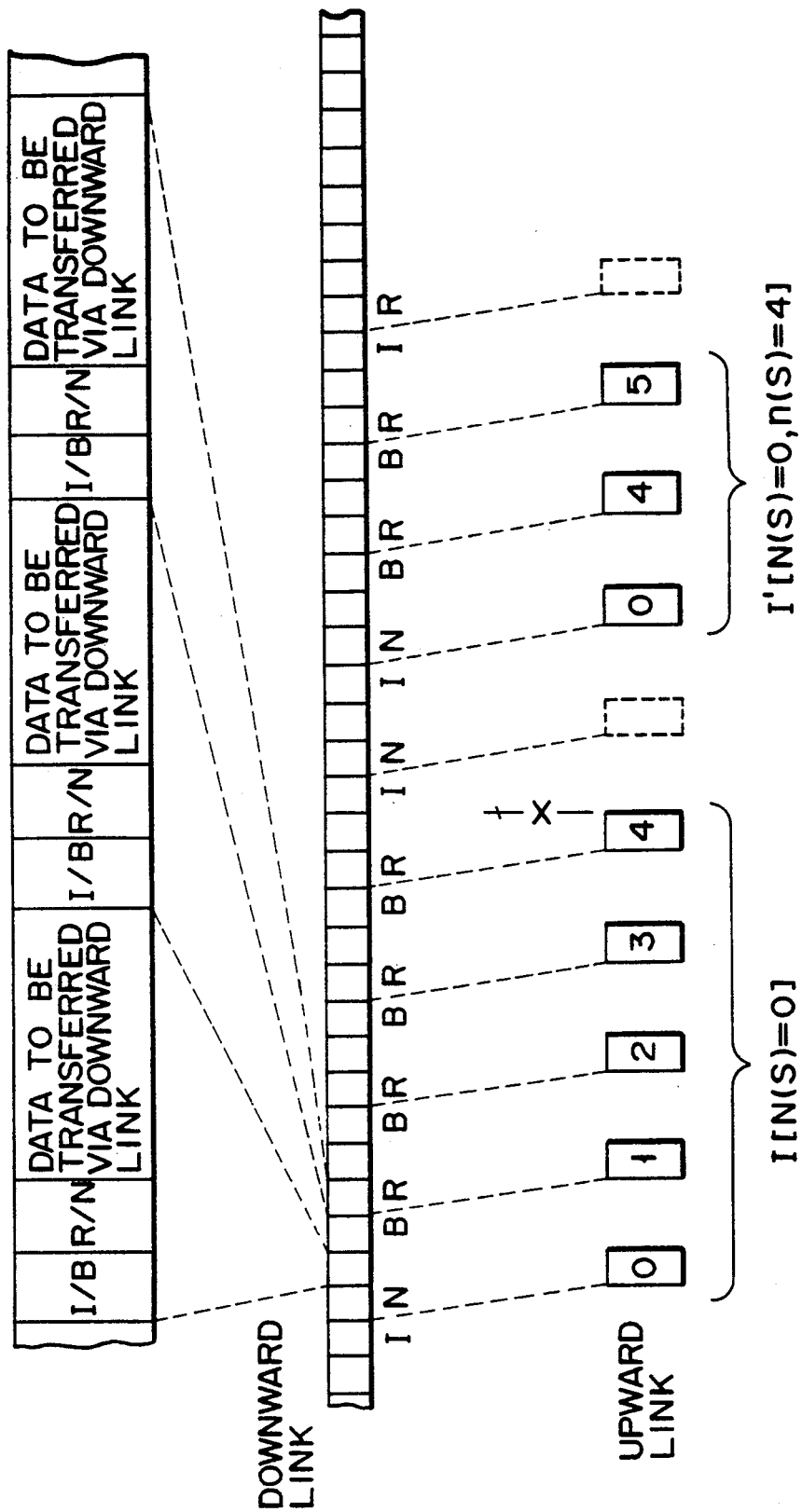
FIG. 6 is a diagram showing the formats of two data pieces which are transferred through two transmission paths, respectively, between the central station and the terminal station, both shown in FIG. 5.

FIG. 6 is a timing chart showing the formats of two data pieces which are transferred through two transmission paths, i.e., the upward link and the downward link, respectively, between the central station and the terminal station, both shown in FIG. 5. A downward link refers to signal transmission from the central station to a terminal station, and an upward link refers to signal transmission from a terminal station to the central station. A plurality of terminal stations send messages to one central station by utilizing the same frequency with the FDMA (frequency domain multiple access) system or by utilizing both the same frequency and data unit for the TDM (time domain multiple) or TDMA (time domain multiple access) systems. FIG. 6 explains how data is received by the central station of the communication system according to the second embodiment of the invention.

As can be understood from FIG. 6, the data to be transmitted through the downward link from the central station to the terminal station is divided into a plurality of data units. Each of the data units contains two indication signals I/B and R/N. The signal I/B is transmitted from the central station to the terminal station, informing whether or not the data unit can be transmitted to the terminal station. The I signal indicates that the data unit can be transmitted, whereas the signal B indicates that the data unit cannot be transmitted. The signal R/N is transmitted from the central station to the terminal station, informing whether or not the central station has received any data unit from the terminal station; the signal R indicates that the central station has correctly received the data unit, whereas the signal N shows that the central station has not received the data unit.

The upward link is used to transfer messages from the terminal station to the central station, more precisely, every third data unit of each message, with a pause between every two adjacent data units transferred as is shown in FIG. 6. The I/B signal contained in any data unit being transferred through the upward link, and the signal R/N contained in the immediately preceding data unit already transferred via the upward link are identical to those contained in the data unit already transferred via the downward link to the terminal station.

In the terminal station (FIG. 5), the signals I/B and R/N, both demodulated by the demodulating circuit 511 and decoded by the decoding circuit 512, are separated from each other and then input to the transmission control circuit 518. To transmit a message to the central station, the transmitting circuit 515 adds a transmission sequence order number N(S) to the message. The message is then encoded by the encoding circuit 516. The transmission control circuit 518 supplies the data units forming the encoded message, in accordance with the I/B signal supplied from the decoding circuit 512. That is, the circuit 518 supplies a data unit to the modulating circuit 517 if the circuit 518 has received the data unit while receiving the signal I from the decoding circuit 512.

Any data unit output from the modulating circuit 517 is transmitted to the central station through the upward link. In the central station (FIG. 5), the data unit is demodulated by the demodulating circuit 501 and then decoded by the decoding circuit 502. The data W representing the number of the data units forming the message is input to the indication control circuit 508. Also, the data showing the condition, in which the central station has received the message, is input to the circuit 508. The indication control circuit 508 outputs a signal R/N to the encoding circuit 506. When the circuit 508 receives the (W-1)th data unit of the message, where W is the number of the data units constituting the message, it outputs a signal B, thus inhibiting any other terminal station from transmitting messages to the central station, so that the message being transmitted through the upward link may be protected against collision with other messages.

In the central station, the receiving circuit 503 checks the number N(S) and the like. Upon receipt of all data units constituting the message: the circuit 503 outputs the message. The circuit 503, the memory circuit 504, and the transmitting circuit 505 operate in the same way as their counterparts shown in FIG. 1.

The receipt of an data unit transmitted through the upward link can be detected and indicated, the terminal station can re-transmit the message in units of frames I', or data units, before receiving a frame REJ', i.e., a re-transmission request, from the central station. Also, the terminal station can stop transmitting the message the moment it is detected that the first frame I has failed to reach the central station. Therefore, unnecessary transmission can be minimized in the case where the message is re-transmitted in units of data units by the GBN method.

With reference to FIG. 6, it will now be explained how the frame I (W=5) is transmitted from the terminal station to the central station. First, it is determined from the I/B signal that the frame I can be transmitted to the central station. Next, the terminal station starts transmitting the frame I(N(S)=0). After the second data unit et seq. have been transmitted, the I/B signal ="B", and the R/N signal="R," and it is determined that the central station has received the second data unit et seq. Hence, the terminal station transmits the other data units to the central station. Assuming that the fourth data unit fails to reach the central station, the central station transfers a signal I/B which is "I" indicating that the data unit not received is the last one, and a signal R/N which is "N" indicating that the data unit has not been received. Upon receipt of the I/B and R/N signals, the terminal station does not transmit the fifth data unit. When the terminal station receives a signal I/B which is "I" some time later, it is determined that data units can be transmitted to the central station. Hence, the terminal station starts transmitting frames I'(N(S)=0) and I'(n(S)=4), thus re-transmitting two data units whose re-transmission sequence order numbers are "4" and "5."

In this instance, data units are not protected from collision with any other data unit if the terminal station receives a signal I/B which is "B" indicating that any data unit has failed to reach the central station. Rather, transmission of data units from another terminal station is allowed, and the terminal station begins to re-transmit the data units upon receipt of a signal I/B which is "I." In the case where data units transmitted in the form of bursts due to their fading interrelationship fail to reach the central station, another re-transmission technique can be more effective in which the data units are set apart on the time axis. If data units fail to reach the central station at random, the central station transfers signals B and N even if it does not receive the entire message. As a result of this, the terminal station can re-transmit the frames I'(N(S)=0) and I(n(S)=4), while the other terminal stations are prohibited from transmitting data units to the central station.

Figure 7:
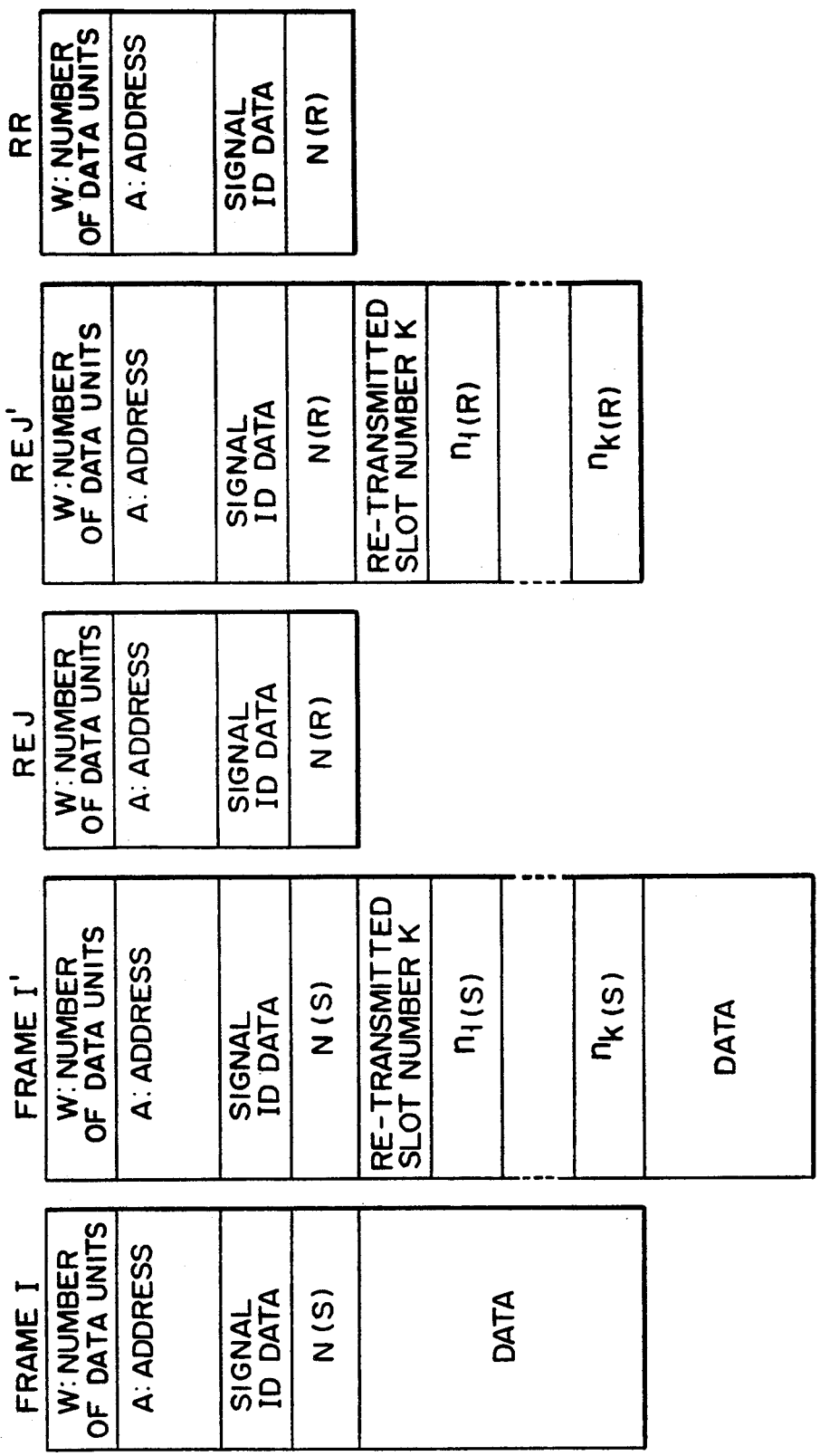
FIG. 7 is a diagram showing the format of data which is re-transmitted under the SR re-transmission control.

The above description is based on the assumption that the terminal station re-transmits some of the data units forming a message under the GBN re-transmission control. Nevertheless, efficient transmission of messages can also be accomplished if data units are re-transmitted under the RS re-transmission control. FIG. 7 is a diagram showing a format of data to be re-transmitted under the SR control. The format shown in this figure is different from that shown in FIG. 3 in two respects. First, the frame I' contains a number of transmission of data units, K, and also contains numbers $n_1(s) \ldots n_K(s)$ instead of the number n(S), which is the first number of retransmission data units. Second, the frame REJ' contains a number of retransmission data units K, and also contains numbers $n_1(R) \ldots n_K(R)$ instead of the number n(R), which is the first number of the retransmission data units. Except for the use of different data format, the SR re-transmission control is the same as the GBN re-transmission control. When the SR control is applied, the number of fields required increases in proportion to the number of data units which must be re-transmitted. When the number of data units exceeds a predetermined value, the re-transmission control can be switched to the GBN control. In other words, in the present invention, the SR control and the GBN control can be applied in combination.

In the case of the GBN re-transmission control, some data units following any data unit failing to reach the central station may be transmitted thereto even if the the format REJ' has been transferred to the central station, requesting inhibition of transmission of data units. Nonetheless, the data units transmitted to the central station can be combined with the signals re-transmitted from the central station, thereby to achieve a more efficient transfer of a message. More specifically, any data unit which has reached the central station when transmitted for the first time, but failed to reach when re-transmitted, is not discarded even in the GBN re-transmission control, thus enhancing the reliability of the communication system by reducing the times data units are re-transmitted from the terminal station to the central station.

The above description is concerned with the technique of determining the receipt or failure of each data unit in accordance with a error correcting/detecting code. Instead, the receipt or failure can be determined in accordance with other criterion, such as the level of signals received or the contents of data received, though the results are somewhat less correct.

In the embodiments described above, the frame I contains no numbers N(R). Nevertheless, a frame I containing a number N(R) can be transferred as in the HDLC, thus replacing the transfer of the format RR. Further, instead of using two fields for the frame I and ID data, respectively, one bit can be used to identify a frame I, and the other data can be of the same format as that used in the HDLC. Still further, all other functions of the HDLC can be applied to the present invention.

To prevent the communication system from becoming complex, the data re-transmission in units of data units can be applied to only messages which consists of more data units than a predetermined number. Moreover, each terminal station need not be designed to re-transmit messages in units of data units. Even if the terminal station cannot re-transmit messages in units of data units, signals can be transferred between the terminal station and the central station, provided that the terminal station can reads REJ' as REJ. Thus, the communication system according to the invention can comprise not only high-performance terminal stations, but also low-performance terminal stations which may be used by users who need not send long messages.

As has been described, the signal transmission system of the present invention is characterized in that a long message is divided into a plurality of data units in a transmitting station, so that the re-transmitted portion of the message is controlled in the units of data units. Thus, it is possible to transmit long messages efficiently through transmission paths eve if the paths have low reliability. Further, the system can transmit messages with sufficient efficiency. This is because, so many fields, as is required in the conventional system wherein each message is divided into units smaller than data units and is re-transmitted unit by unit, need not be added to each message so that the message may contain addresses and other data items required for the re-transmission control.

Figure 9:
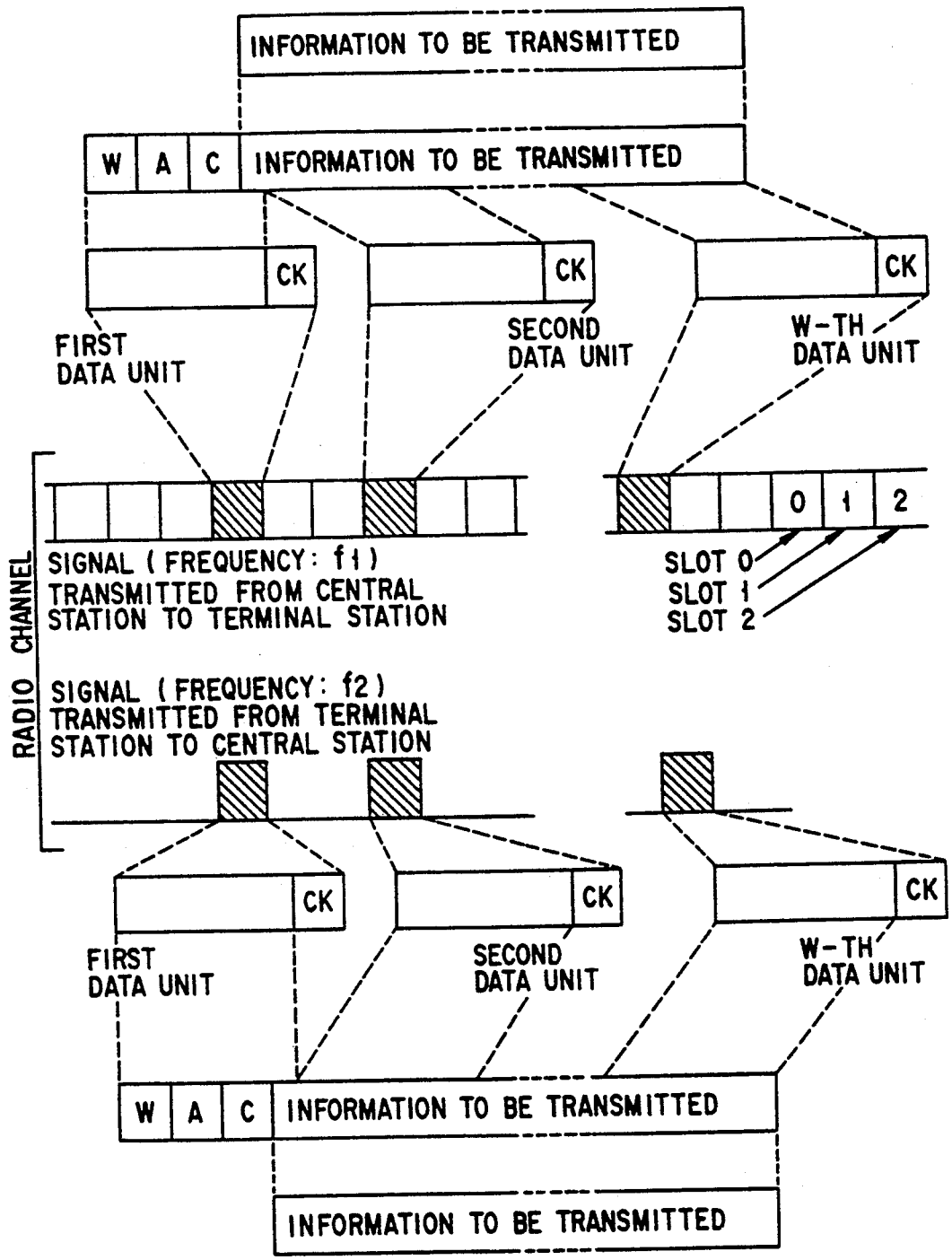
FIG. 9 is a diagram illustrating transmission from a central station to a terminal station in a TDM system, and from a terminal station to the central station in a TDMA system.

FIG. 9 shows the case where the transmission from the central station to a terminal station is structured as a 3-channel TDM (time domain multiple) system and where the transmission from the terminal station to the central station is structured as a 3-channel TDMA (time domain multiple access) system. In the systems shown in FIG. 9, one of the three channels (i.e., slot 0) is used for communication, and the transmission timings are determined by slots in accordance with a data unit length.

The reference symbols "W", "A", "C" and "CK" in FIG. 9 denote the following:
W:the number of data units constituting a message;
A:an address display area for identifying a transfer destination terminal (i.e., a terminal to which a message is addressed);
C:
 (a) a signal type display area for indicating the type of a message transfer frame;
 (b) a message sequence number display area
 (c) a data unit number display area
CK:an error detecting/correcting code bit used for the transmission in a radio interval The reference symbols "W", "A", "C" and "CK" in FIG. 10 also denote the same as above.

FIG. 10 shows an FDMA (frequency domain multiple access) system, wherein transmission timings are determined by data units in accordance with a data unit length.

FIG. 11 discloses specific structures for carrying out the present invention. When a message is transmitted, the frame forming circuit 15b attached "W, A, signal identification data and N(S)" ("N(S) and n(S)"; or "N(R) and n1(R) . . . nk(R)") to the message, so as to form frame I or I'.

When the retransmission of a message is requested, the frame forming circuit is informed of "N(R)" ("N(R) and n(R)", or "N(R) and n1(R) . . . nk(R)") from the error determination circuit of the reception processor. Based on the information, the frame forming circuit reads out either the entire message or designated data units from the memory circuit of the transmission section, and attaches "W, A, signal identification data and N(S)"("N(S) and n(S)"; or "N(R) and n1(S) . . . nk(S)") to the message, so as to form frame I or I'.

In the case of a response signal to message transmission:

(1) To inform correct reception of a message, the frame forming circuit forms an RR frame in accordance with "W, A, signal identification data and N(R)".

(2) To request the retransmission of the entire message, the frame forming circuit forms an REJ frame in accordance with "W, A, signal identification data and N(R)".

(3) To request the retransmission of particular data units, the frame forming circuit forms an REJ' frame in accordance with "W, A, signal identification data N(R) and n(R)" (or "N(R) and n1(R) . . . nk(R)").

Frame dividing circuit 15a divides a frame formed by the frame forming circuit 15b into data units of predetermined length.

In order to cope with the retransmission of a transmission message, the frame dividing circuit 15a causes the memory circuit 15c of the transmission section to store the entire message in units of one data unit.

In order to cope with the retransmission of a transmission message, the memory circuit 15c stores, in units of one data unit, the entire message supplied from the frame dividing circuit 15a.

The entire message which has been correctly transmitted to the message-receiving station is erased from the memory circuit 15c when the information indicating the correct reception of the message is supplied from the error determination circuit 13a of the signal reception processor.

Error correcting/encoding circuit 16 performs error correction and encoding in units of one transmitted data unit.

Modulation circuit 17 modulates signals.
The antenna transmits or receives radio signals.
Demodulation circuit 11 demodulates signals.
Error correcting/decoding circuit 12 performs error correction and detection, and the data unit identified thereby is supplied to the error determination circuit 13a.

Error determination circuit 13a determines the number identifying a data unit that has been incorrectly received or has not been received, and informs the frame forming circuit 15b and the memory circuit 15c of the transmission section of a message order number and a data unit number, so as to request the retransmission of the data unit.

The error determination circuit 13a causes data units, which have been correctly received, to be stored in the memory circuit 14 of the reception section, along with the related message order numbers and data unit numbers.

Memory circuit 14 of reception section stores correctly-received data units, the message order numbers, and data unit numbers which are supplied from the error determination circuit. When all data units constituting one message have been received, they are supplied to the message preparing circuit 13b.

The message whose data units have been correctly received is read out by message preparing circuit 13b from the memory circuit 14 of the reception section, and the information portion of that message is transferred as a reception message.

Figure 13:
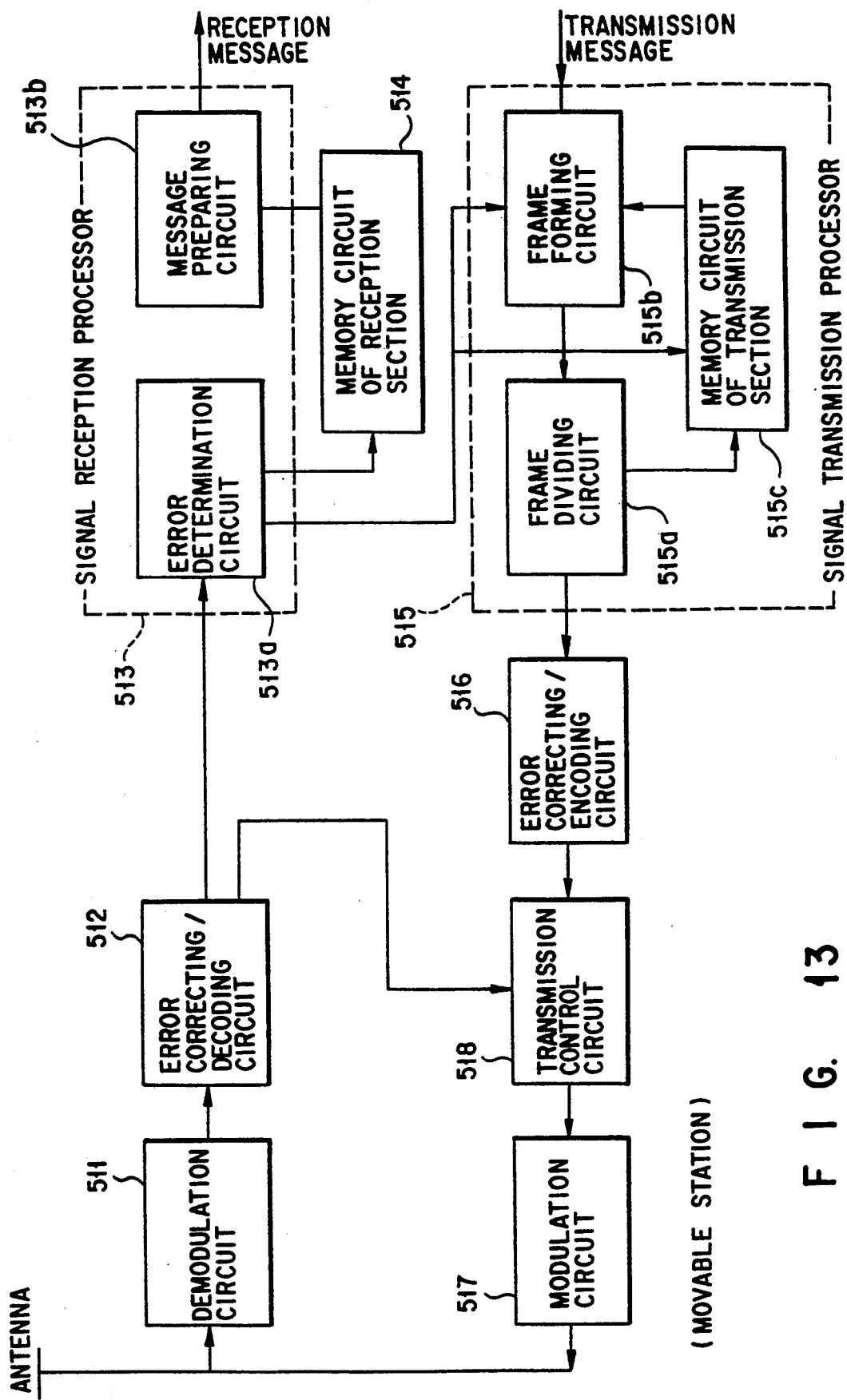
FIG. 13 is a block diagram illustrating the structure of a movable station.

FIG. 12 illustrates the structure of a base station, while FIG. 13 illustrates the structure of a movable station. The function of each structural element shown in new FIG. 12 is explained as follows.

When a message is transmitted, the frame forming circuit 505b attaches "W, A, signal identification data and N(S)" ("N(S) and n(S)"; or "N(R) and n1(R)−nk(R)") to the transmission message, so as to form frames I and I'.

When the retransmission of a message is requested, the frame forming circuit is informed of "N(R)" and ("N(R) and n(R)"; or "N(R) and n1(R) . . . nk(R)") from the error determination circuit of the reception processor. Based on the information, the frame forming circuit reads out either the entire message or designated data units from the memory circuit 505c of the transmission section, and attaches "W, A, signal identification data and N(S)"("N(S) and n(S)"; or "n1(S) . . . nk(S)") to the message, so as to form frames I and I'.

In the case of a response signal to message transmission:

(1) To inform correct reception of a message, the frame forming circuit forms an RR frame in accordance with "W, A, signal identification data and N(R)".

(2) To request the retransmission of the entire message, the frame forming circuit forms an REJ frame in accordance with "W, A, signal identification data and N(R)".

(3) To request the retransmission of particular data units, the frame forming circuit forms an REJ' frame in accordance with "W, A, signal identification data, N(R) and N(R)" (or "N(R) and n1(R) . . . nk(R)").

Frame dividing circuit 505a divides a frame formed by the frame forming circuit 505b into data units of predetermined length. In order to cope with the retransmission of a transmission message, the frame dividing circuit 505a causes the memory circuit 505c of the transmission section to store the entire message in units of one data unit.

In order to cope with the retransmission of a transmission message, the memory circuit 505c stores, in units of one data unit, the entire message supplied from the frame dividing circuit. The entire message which has been correctly transmitted to the message-receiving station is erased from the memory circuit 505c, when the information indicating the correct reception of the message is supplied from the error determination circuit 503a of the signal reception processor.

Error correcting/encoding circuit 506 performs error correction and encoding in units of one transmitted data unit.

Modulation circuit 507 modulates signals.

The antenna transmits or receives radio signals.

Demodulation circuit 501 demodulates signals.

Error correcting/decoding circuit 502 performs error correction and detection, and the data unit identified thereby is supplied to the error determination circuit 503a and the notification control circuit 508a.

Error determination circuit 503a determines the number identifying a data unit that has been incorrectly received or has not been received, and informs the frame forming circuit 505b and the memory circuit 505c of the transmission section of a message order number and a data unit number, so as to request the retransmission of the data unit.

The error determination circuit 503a causes data units, which have been correctly received, to be stored in the memory circuit 504 of the reception section, along with the related message order numbers and data unit numbers.

When it is determined on the basis of an output of the error correcting/decoding circuit 502 that a preceding data unit has been correctly received, the notification control circuit 508a sets "R" in the "R/N" (Reception/Non-Reception) field. On the other hand, when it is determined that the preceding data unit has not be received or has been incorrectly received, the notification control circuit sets "N" in the "R/N" field.

The notification control circuit 508a sets "I" in the "I/B" field, when it is determined that a preceding data unit has not been received or has been incorrectly received. The notification control circuit also sets "I" in the "I/B" field, when it is determined that W data units have been correctly received. If it is required that the 1st to (W−1)th data items of one message be transmitted, "B" is set in the "I/B" field, so as to present transmission from another movable station.

Memory circuit 504 of reception section stores correctly-received data units, the message order numbers, and data unit numbers which are supplied from the error determination circuit 503a.

When all data units constituting one message have been received, they are supplied to the message preparing circuit 503b. The message whose data units have been correctly received is read out by message preparing circuit 503b from the memory circuit 504 of the reception section, and the information portion of that message is transferred as a reception message.

The function of each structural element shown in new FIG. 13 is explained as follows.

When a message is transmitted, the frame forming circuit 515b attaches "W, A, signal identification data and N(S)" ("N(S) and n(S)"; or "N(R) and n1(R). . .nk(R)") to the transmission message, so as to form frames I and I'.

When the retransmission of a message is requested, the frame forming circuit is informed of "N(R)" ("N(R) and n(R)"; or "N(R) and n1(R) . . . nk(R)") from the error determination circuit 513a of the reception processor. Based on the information, the frame forming circuit 515b reads out either the entire message or designated data units from the memory circuit of the transmission section, and attaches "W, A, signal identification data and N(S)"("N(S) and n(S)"; or "n1(S)−nk(S)") to the message, so as to form frames I and I'.

In the case of a response signal to message transmission:

(1) To inform correct reception of a message, the frame forming circuit forms an RR frame in accordance with "W, A, signal identification data and N(R)".

(2) To request the retransmission of the entire message, the frame forming circuit forms an REJ frame in accordance with "W, A, signal identification data and N(R)".

(3) To request the retransmission of particular data units, the frame forming circuit forms an REJ' frame in accordance with "W, A, signal identification data, N(R) and N(R)" (or "N(R) and n1(R) . . . nk(R)").

Frame dividing circuit 515a divides a frame formed by the frame forming circuit 515b into data units of predetermined length. In order to cope with the retransmission of a transmission message, the frame dividing circuit 515a causes the memory circuit 515c of the transmission section to store the entire message in units of one data unit.

In order to cope with the retransmission of a transmission message, the memory circuit 515c stores, in units of one data unit, the entire message supplied from the frame dividing circuit.

The entire message which has been correctly transmitted to the message-receiving station is erased from the memory circuit 515c when the information indicating the correct reception of the message is supplied from the error determination circuit 513a of the signal reception processor.

Error correcting/encoding circuit 516 performs error correction and encoding in units of one transmitted data unit.

Modulation circuit 517 modulates signals.

The antenna transmits or receives radio signals.

Demodulation circuit 511 demodulates signals.

Error correcting/decoding circuit 512 performs error correction and detection, and the data unit identified thereby is supplied to the error determination circuit 513a and the notification control circuit 518.

Error determination circuit 513a determines the number identifying a data unit that has been incorrectly received or has not been received, and informs the frame forming circuit 515b and the memory circuit 515c of the transmission section of a message order number and a data unit number, so as to request the retransmission of the data unit.

The error determination circuit causes data units, which have been correctly received, to be stored in the memory circuit 514 of the reception section, along with the related message order numbers and data unit numbers.

Transmission control circuit 518 controls transmission in accordance with the state of the "I/B" field notified by the base station. When it receives "I", the transmission can be started. When it receives "B", transmission of the data which is being transferred can be continued, but transmission of new data cannot be performed. When "N" is set to "R/N", the transmission is inhibited.

Memory circuit 514 of reception section stores correctly-received data units, the message order numbers, and data unit numbers which are supplied from the error determination circuit 513a. When all data units constituting one message have been received, they are supplied to the message preparing circuit 513b. The message whose data units have been correctly received is read out by message preparing circuit 513b from the memory circuit of the reception section, and the information portion of that message is transferred as a reception message.

Figure 8:
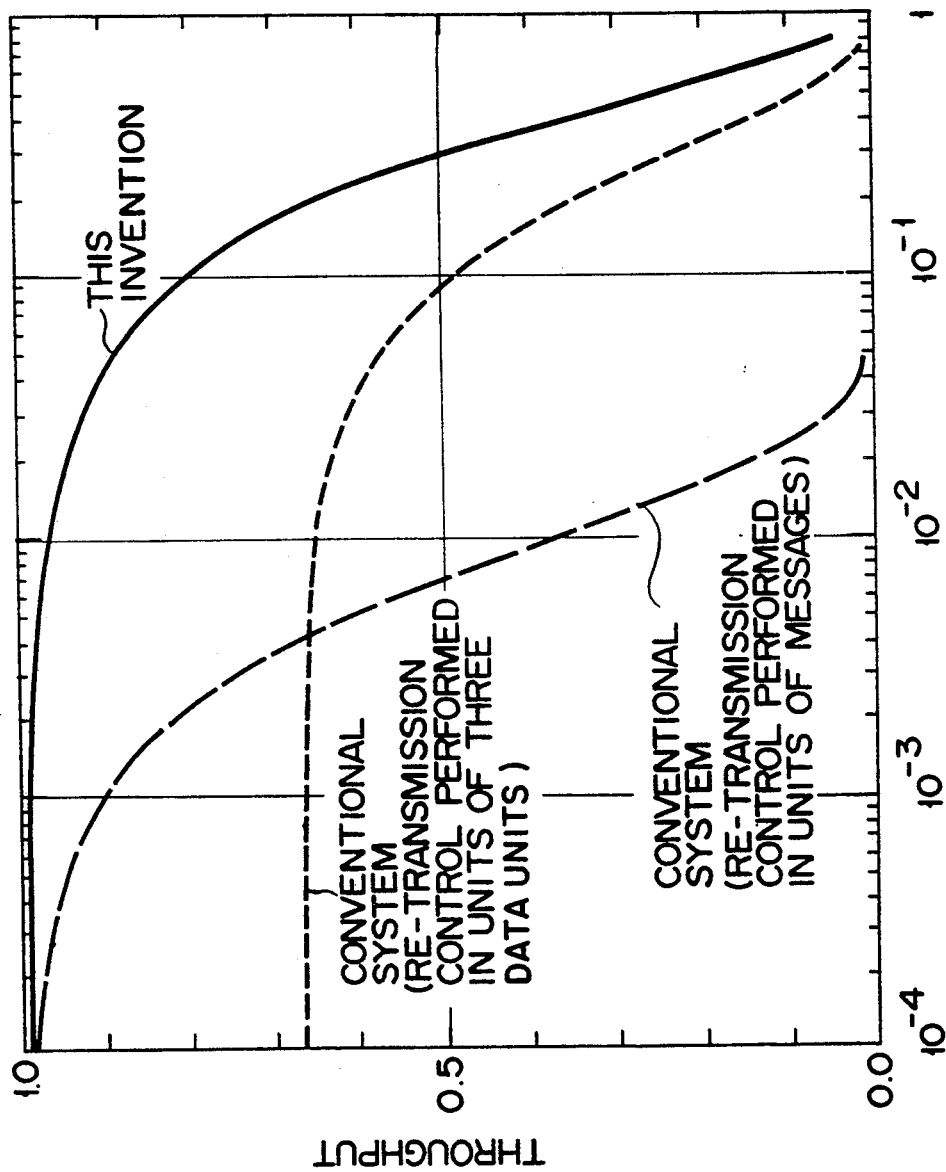
FIG. 8 is a graph representing the throughput of a signal transmission system according to the invention and those of two conventional signal transmission systems.

FIG. 8 is a figure representing the throughput provided by the signal transmission system of the invention which performs the SR re-transmission control in units of data units, the throughput obtained by a conventional systems which performs the S re-transmission control in units of long messages, and the throughput obtained by a conventional system which performs the SR re-transmission control in units of three data units. The term "throughput" means ratio of the time of using the channel to receive all valid data except overhead such as addresses, to all the time during which the channel is occupied, in the case where every message consists of 100 data units one of which is the overhead such as addresses. As is evident from FIG. 8, the system according to the invention provides a greater throughput than either conventional system, over the entire range of rate of failure of data units.

As is known, the transmission paths of a mobile communication system are insufficiently reliable when a mobile station communicating with the central station is far from the central station. They are fairly reliable when the mobile station happens to be close to the central station. In other words, their reliability vary in accordance with the distance between the central station of the mobile station. In the signal transmission system of the present invention, data having but a little overhead is transmitted with high efficiency when the transmission paths are sufficiently reliable, making it unnecessary to re-transmit data, and performs re-transmission control in smaller units of data, thus minimizing the necessity of re-transmission, when the transmission paths have relatively low reliability.

As has been described, the present invention is characterized in that a long message is divided into a plurality of data units in a transmitting station, so that the re-transmitted of the message is controlled in units of data units. Thus, long messages can be efficiently transmitted through transmission paths even if the paths have low reliability. Further, messages can be transmitted with high efficiency since so many fields, as is required in the conventional system wherein each message is divided into units smaller than data units and is re-transmitted unit by unit, need not be added to each message so that the message may contain addresses and other data items required for the re-transmission control.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A signal transmission system for use in a digital communication system wherein a message is transferred between a central station and a terminal station, with one of said central and terminal stations serving as a message sender and the other as a message receiver at a given time, said system comprising:

means in said message sender for providing a message transfer signal (I') used for transmission of a message by the message sender and which includes: a sequence number N(S) for controlling retransmission performed in units of one message, a sequence number n(S) for controlling retransmission performed in units of one data unit, and an identification code (ID) of a terminal station;

means in said message sender for providing a retransmission request signal (REJ') used for requesting retransmission of data units by the message receiver and which includes: a sequence number (N(R))) for controlling retransmission performed in units of one message, a sequence number (n(R)) for controlling retransmission performed in units of one data unit, and an identification code (ID) of a terminal station;

means in said message sender for dividing a message into a plurality of said data units, encoding each of the data units for use by the message receiver to detect and correct errors included therein, if any, and sequentially retransmitting the plurality of data units of said message; and means in said message receiver for receiving the message, decoding each of the plurality of data units thereof while detecting and correcting errors included therein, if any, and determining whether the message has been correctly received;

wherein said message receiver includes control means for first checking the plurality of data units of the message by examining the sequence number (N(S)) for controlling retransmission performed in units of one message, the terminal station identification code (ID), and a result of determining whether said message has been correctly received, and when transmitting to the message sender a retransmission request signal (REJ') such that the retransmission request signal (REJ') includes: a sequence number (n(R)) for controlling retransmission performed in units of one or more messages, and a sequence number (n(R)) used for controlling retransmission performed in units of one or more data units; and wherein said message sender, to which the retransmission request signal (REJ') is transmitted, includes retransmission means for first checking the retransmission request signal (REJ') and then starting retransmission of either an entire message in accordance with the sequence number (N(R)) used for controlling retransmission performed in units of one or more messages, and one or more data units in accordance with the sequence number (n(R)) used for controlling retransmission performed in units of one or more data units.

2. The signal transmission system according to claim 1, which has a terminal station as said message sender and a central station as said message receiver, said message receiver includes:

a first setting means for setting an I/B field on a signal transmitted from said message receiver at regular intervals, in order to inform said message sender whether or not said message sender can send a next signal; and a comparing means for comparing the number W of data units comprising message signals in a signal from said message sender with the number A of data units which have been received, wherein:

where W>A, there still exists data units to be transferred, so that the I/B field is made to have a bit pattern that indicates a busy (B) state, and inhibiting terminal stations from performing message transmission, except for a terminal station that is presently performing message transmission, and allowing only the terminal station that is presently performing message transmission to continue the message transmission, and where a signal is not received at said message receiver, or W≦A, the message sender can start transmitting a new message signal at the next transmission timing, so that the I/B field is made to have a bit pattern that indicates an idle (I) state, thereby allowing the message sender to start transmission of the new message, a first sending means for sending said bit patterns that indicate the state of the I/B field to said message sender;

a second setting means for setting at regular intervals an (R/N) field on a signal transmitted from the message receiver, said (R/N) field representing a state of whether or not a data unit transmitted by the message sender is correctly received by the message receiver, and providing information regarding the state of said fields (I/B, R/N) for each of the data units; and a second sending means for sending a bit pattern that indicates the states of the R/N field to said message sender, said (R/N) field being made to have a bit pattern that indicates a reception (R) sate where a data unit of a message sent from said message sender has been received correctly at said message receiver, and to have a bit pattern that indicates a non-reception (N) state where a data unit of a message sent from said message sender has been received incorrectly at said message receiver;

said message sender including:

a first sending means for sending data representing the number W of data units constituting a message signal by adding the data to the message signal;

a receiving means for receiving said R/N fields; and a second sending means for sending the next data unit when the received bit pattern is R and a message is still being sent, and for inhibiting itself from sending data slots after the next data unit when the received bit pattern is N, wherein a message signal and data units are sent in accordance with the information regarding said fields (I/B, R/N) that indicates the states of the I/B or R/N field sent from said message receiver.

3. A signal transmission system according to claim 1, wherein:

the control means of said message receiver examines the sequence number (N(S)) used for controlling retransmission performed in units of at least one message, the terminal station identification code (ID), and a result of determining whether said message has been correctly received so that, in the case where the sequence number (N(S)) is not +1 larger than a last-received sequence number (N(S), said control jeans transmits to the message sender said retransmission request signal (REJ) such that the retransmission request signal (REJ) includes a sequence number (N(R)) used for controlling retransmission performed in units of at least one message and, in the case where the sequence number (N(S)) is +1 larger than the 1st-received sequence number (N(S)) but the received data units include an incorrectly-received data unit, said control means transmits to the message sender a retransmission request signal (REJ') such that the retransmission request signal (REJ') includes: a sequence number (n(R)) used for controlling retransmission performed in units of at least one data unit; and wherein, if said message sender receives the retransmission signal (REJ') including the sequence number (N(R), n(R)), the retransmission means of said message sender retransmits at least one data unit included in the message represented by the sequence number (N(R)).

4. The system according to claim 3, wherein said message receiver further comprises:

a) signal means for periodically providing to the message sender a signal indicative of the condition in which each data unit has reached the message receiver so as to indicate whether or not the message signal has been reliably received by the message receiver; and said message sender further comprises:

b) means for controlling the retransmission means to perform the retransmission, in accordance with the signal indicative of the condition of each data unit provided by said signal means periodically to the message sender.

5. A digital radio communication system for transferring messages between a terminal device and a central device, with one of said central and terminal devices serving as a message-transmitting station and the other as a message receiving station, said message-transmitting station comprising:

means for providing the following information (a) to (e) to be transmitted as a message in a frame forming circuit:

(a) a message sequence number field as part of the message for identifying a particular message where a plurality of messages are transferred;
(b) a data unit number field as part of the message for identifying data units where one message is transformed while being divided into a plurality of data units;
(c) a signal type field as part of the message for identifying the type of a message;
(d) an address field as part of the message for identifying a transfer destination terminal; and
(e) a field as part of the message for indicating the number of data units constituting the entirety of the message;

means for dividing the entirety of a message, which contains area added by said providing means, into data units of predetermined length;

means for executing error detection and error correction encoding for each of the data units;

means for transmitting a data unit for which the error detection and correction encoding have been executed;

means for storing contents of each data unit, so as to allow retransmission of each data unit in response to a retransmission request made by the message-receiving station; and means for retransmitting only that data unit which corresponds to a data unit number designated by a retransmission request signal supplied from the message receiving station, said message-receiving station comprising:

means for demodulating a data unit transmitted from the message-transmitting station and executing error correction and error decoding and detection;

means for receiving information W indicating how many data units are used in a message to be transmitted, comparing the number of data units received with W, and determining that the entire message has been received, where W equals the number of data units received, and for informing the message-transmitting station of the completion of message reception when all data units constituting a message have been correctly received; and means for receiving information W indicating how many data units are used in a message to be transmitted, comprising the number of data units received with W, and for requesting retransmission of data units, where W is larger than the number of data units received and a data unit not received or incorrectly received has been detected, by informing the message-transmitting station of data unit number corresponding to the data unit not received or incorrectly received.

* * * * *